(12) United States Patent
Lindsey et al.

(10) Patent No.: US 7,300,580 B2
(45) Date of Patent: Nov. 27, 2007

(54) BEVERAGE POURER WITH MAGNETIC ENHANCEMENT

(75) Inventors: H. McMillan Lindsey, Westminster, CA (US); Thomas A. Thompson, Long Beach, CA (US); Patrick L. Farrell, Huntington Beach, CA (US)

(73) Assignee: Inventive Technologies, Inc., Westminster, CA (US)

( * ) Notice: Subject to any disclaimer, the term of this patent is extended or adjusted under 35 U.S.C. 154(b) by 637 days.

(21) Appl. No.: 10/893,204

(22) Filed: Jul. 16, 2004

(65) Prior Publication Data

US 2006/0011629 A1    Jan. 19, 2006

(51) Int. Cl.
*C02F 1/48* (2006.01)
*C12H 1/00* (2006.01)
*B65B 51/00* (2006.01)

(52) U.S. Cl. .................. 210/222; 210/695; 220/230; 99/275; 99/277.1

(58) Field of Classification Search ................ 210/222, 210/695; 99/275, 277.1; 220/230
See application file for complete search history.

(56) References Cited

U.S. PATENT DOCUMENTS

| | | | |
|---|---|---|---|
| 655,413 A | 8/1900 | Parkyn | |
| 824,320 A | 6/1906 | Weitzmann | |
| 1,863,222 A | 6/1932 | Hoermann | |
| 2,195,662 A | 4/1940 | Van Sant | |
| 2,498,735 A | 2/1950 | Brasch | |
| 2,672,257 A | 3/1954 | Simmonds | |
| 3,235,133 A | 2/1966 | Zimmerman et al. | |
| 3,674,513 A | 7/1972 | Elsner et al. | |
| 4,872,401 A | 10/1989 | Lee | |
| 5,113,751 A | 5/1992 | Holcomb et al. | |
| 5,500,121 A | 3/1996 | Thornton et al. | |
| 5,556,654 A | 9/1996 | Fregeau | |
| 5,860,353 A | 1/1999 | Ceccarani | |
| 6,287,614 B1 | 9/2001 | Peiffer | |
| 6,325,942 B1 | 12/2001 | Freije, III | |
| 6,332,706 B1 | 12/2001 | Hall | |
| 6,390,319 B1 | 5/2002 | Yu | |
| 6,568,660 B1 | 5/2003 | Flanbaum | |
| 6,733,434 B2 | 5/2004 | Jacobson | |
| 7,100,495 B2 * | 9/2006 | Lutzker ................ 210/222 |
| 2003/0003189 A1 | 1/2003 | Lutzker | |
| 2003/0028070 A1 | 2/2003 | Jacobson | |
| 2003/0226447 A1 | 12/2003 | Flick | |

FOREIGN PATENT DOCUMENTS

| | | |
|---|---|---|
| AU | 7915798 | 12/1998 |
| KR | 2002095410 A | 12/2002 |
| WO | WO 9627302 | 9/1996 |

* cited by examiner

*Primary Examiner*—David A Reifsnyder
(74) *Attorney, Agent, or Firm*—Walter A. Hackler

(57) ABSTRACT

A pourer for improving organoleptic properties for various beverages includes a base and a tubular member extending longitudinally through the base. A spout extends outwardly from the tubular member and at least two magnets disposed longitudinally along the tubular member are provided for exposing the beverage to a magnetic field as the beverage passes through the tubular member and spout.

7 Claims, 1 Drawing Sheet

BEVERAGE POURER WITH MAGNETIC ENHANCEMENT

The present invention generally relates to apparatus and methods for improving the organolaptic properties of bottled beverages and is more particularly directed to apparatus and method for exposing bottled beverages to a magnetic field. With regard to alcoholic beverages, the present invention reduces the perception of tannins and acid. Such alcoholic beverages include wine, brandies, sherries, ports, cognac, spirits, beer, and any other alcoholic beverage.

Besides the tannins in wine, there are polyphenolic compounds in coffee, tea, fruit juice, and vegetable juice. The production processes of these beverages in such that the polyphenolic compounds found in coffee beans, tea leaves, fruit skins and seeds, and vegetable skins and seeds are extracted into the beverages, either by the action of heat, enzymes, mechanical action, or combination thereof. These compounds have become increasingly investigated and are integral to the health promoting properties of some of these beverages. As such, there is a trend to increase such polyphenolic compounds in such beverages. The downside of such extraction is that bitterness is a side effect of such polyphenols and the processing process. These tannins and polyphenols also tend to obscure the underlying flavors of the coffee, tea, wine, spirits, beer, fruit juice, and vegetable juice.

As is well known, tannins are harsh, bitter, astringent, and dry tasting compounds in wines which are caused by grape skins, seeds, stems, or the use of wood, such as in barrels, strips of chips, which often are utilized for the aging of wine or to impart desired taste characteristics to alcoholic beverages, including wines, fortified wines, and whiskeys.

As is also well known in wines, such tannins polymerize during aging and accordingly older wines generally have a softer texture, smoother, and fruiter taste than the same wine at a younger age.

The use of magnets to alter the composition of tannins in alcoholic beverages, particularly wine, has been known for some time. For example, as early as 1900, magnetic drinking cups were developed, see U.S. Pat. No. 855,413. U.S. Pat. No. 4,872,401 provides for a device for improving the flavor or removing the piquant flavor of fermented products utilizing a container with surrounding walls having magnets disposed thereon. In this manner, the composition of the tannins is altered so as to make the perception of astringency less.

U.S. Pat. No. 5,556,654 provides for passing a liquid through a magnetic field in order to enhance the flavor of the liquid utilizing tubular permanent magnets for treating a liquid prior to bottling thereof.

U.S. Pat. No. 5,860,353 provides for apparatus and a method for accelerating aging of alcoholic liquids such as wines, brandies, spirits, and the like within bottles disposed in a rack.

U.S. Pat. No. 6,287,614 utilizes a coaster having a magnet for improving the organoleptic properties of alcohol in a bottle.

U.S. Pat. No. 6,390,319 provides for a beverage container having a volume exposed to magnetic fields.

U.S. Patent Application 2003/0003189 A1 provides for establishing a magnetic field within a bottle in order to cause certain molecules in the wine to flow from the bottom of the bottle to the top in a constant motion along the flux lines of the magnetic field between the bottom and the top of the magnet.

U.S. Patent Application 2003/0028070 A1 provides for a method for restructuring an ingestible substance and constituents thereof by providing magnetic fields of specific flux densities.

U.S. Patent Application Ser. No. 2003/0226447 A1 provides for a beverage flavor enhancing device having a base and a plurality of tubular members extending upwardly from the base and arrange in a spaced apart relationship to receive the beverage container and subject any container to a magnetic field.

It is clear that none of the hereinabove developed devices provide a convenient means for an end user, such as a wine connoisseur, to conveniently and selectively magnetically treat wine or other alcoholic beverage without extensive apparatus or without treating an entire bottle of alcoholic beverage. It should be clear that if an entire bottle is treated with a magnetic field to effect the organoleptic qualities of the beverage contained therein there can be no real specific comparison of treated and untreated beverage from the same bottle.

The present invention provides for a pourer for enabling selective magnetic treatment of alcoholic beverages which is convenient, simple to use, and does not require extensive equipment or the treatment of whole bottles of alcoholic beverage. The pourer in accordance with the present invention is simple in design and the effects are noted immediately as, for example, wine is exposed to both a magnetic field and to oxygen.

SUMMARY OF THE INVENTION

A pourer in accordance with the present invention for improving organoleptic properties of various alcoholic beverages generally includes a base and a tubular member extending longitudinally through the base along with a spout extending outwardly from the tubular member.

At least two magnets are disposed longitudinally along the tubular member for exposing the beverage to a magnetic field as the beverage passes through the tubular member and spout. It should be appreciated that the magnetic field is concentrated into the alcoholic beverage passing through the tubular member because the tubular member may have a lumen therethrough of (for example) ½ inch or less. Accordingly, the volume of beverage is not of the size requiring either very large magnets or a long term of treatment as has been the case with prior art devices for treating alcoholic beverages with magnetic fields.

In one embodiment of the present invention, the pourer includes a stopper extending from the base for insertion into a bottle mouth and a skirt may be provided and extending from the base for surrounding the stopper and the bottle mouth.

To further enhance or change the organoleptic properties of the alcoholic beverage, rapid exposure to oxygen in the air occurs the beverage is poured. Alternatively, an air intake may be provided including an opening disposed transverse to the tubular member for enabling air to be drawn into the beverage as it is descanted through the tubular member. Thus, the alcoholic beverage, such as wine, may be simultaneously treated with a magnetic field and aerated.

Any number of magnets may be utilized, however, such magnets should be disposed for enhancing the magnetic field therebetween. Accordingly, two magnets may be disposed 180° degrees from one another around the tubular member.

It follows that a method for improving the organoleptic properties of bottled alcoholic beverages in accordance with the present invention generally include inserting a pourer as hereinabove described in the bottle and exposing a beverage to the magnetic field as the beverage is pourer from the bottle.

BRIEF DESCRIPTION OF THE DRAWINGS

The advantages and features of the present invention will be better understood by the following description when considered in conjunction with the accompanying drawings in which.

DETAILED DESCRIPTION

Figure 1:
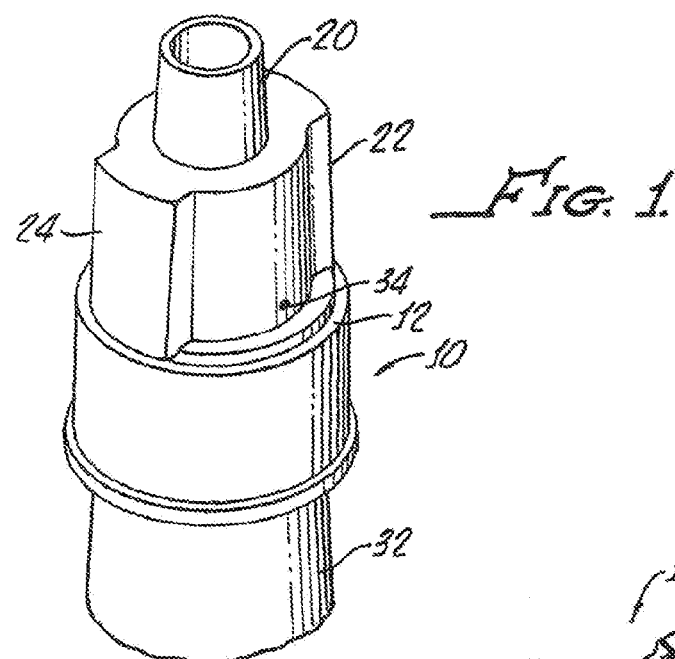
FIG. 1 is a perspective view of the present invention generally including a pourer and showing a base, spout, skirt, and magnets for exposing beverage to a magnetic field.
Figure 2:
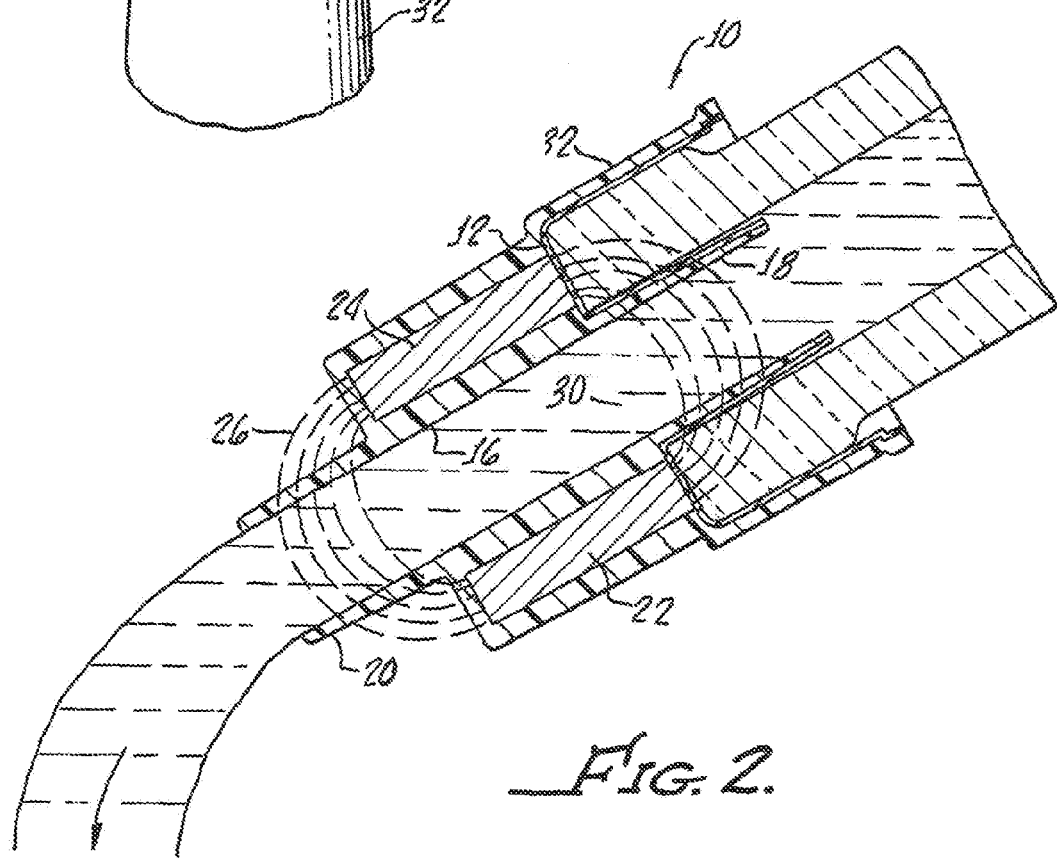
FIG. 2 is a cross sectional view of the pourer shown in FIG. 1 illustrating the pouring of a beverage through the pourer and exposure to a magnetic field.

With reference to FIGS. 1-2, there is shown a pourer 10 in accordance with the present invention for improving the organoleptic properties of various alcoholic beverages. As is best shown in FIG. 2 the pourer 10 includes a base 12 along with a tubular member 16 extending longitudinally through the base 12. A spout 20 extends outwardly from the tubular member 16 and at least two permanent magnets 22, 24 are disposed longitudinally along the tubular member 16 for exposing a beverage to a magnetic field as the beverage passes through the tubular member 16 and spout 20 the magnetic field being represented by lines 26. The longitudinal placement enhances the efficiency of coupling the magnetic field with the beverage passing through the tubular member 16. The permanent magnets 22, 24 may be of any suitable type formed from, for example, iron, steel, or rare earth, such as neodymium, atrontium, and alnico, etc.

More particularly, the pourer 10 includes a stopper 18 extending from the base 12 for insertion into a bottle mouth 30. The stopper 18 is sized and tapered for sealably engaging the bottle mouth 30. In addition, a skirt 32 may be provided for surrounding the stopper 18 and the bottle mouth to prevent the entry of any contamination into the bottle mouth.

While the pourer 10 design enables rapid exposure to oxygen upon pouring, an air intake opening 34 may be provided and extends transversely to the tubular member 16 for enabling air to be drawn into the beverage as it is decanted through the tubular member 16.

As shown, preferably the magnets 22, 24 are disposed 180° degrees from one another or on the tubular member and preferably abut a top portion 38 of the skirt 32 in order that the beverage is immediately exposed to the magnetic field upon entry into the tubular member 16.

Preferably, the base 12, stopper 18, tubular member 16, and spout 20 are integrally formed with the magnets 22, 24 embedded therein. Any suitable plastic may be used for this purpose.

Preferably, the base 12, stopper 28, tubular member 16, and spout 20 are integrally formed with the magnets 22, 24 embedded therein. Any suitable plastic may be used for this purpose.

The pourer 10 includes a relatively small aperture in the tubular member 16 (to ensure a strong magnetic field), flanked by two strong magnets 22, 24, is affixed to the opening of a bottle, flask, coffee or tea dispenser, fruit juice bottle or carton, vegetable juice bottle or carton, spirits bottle, or beer bottle. The fluid, as it passes the strong magnetic field, causes an alteration in the configuration of the charged particles that impart bitterness in these beverages. With immediate exposure to air, chemical changes occur to the structure and configuration of these polyphenols and other chemical so as to make the beverages taste less bitter and less astringent. Underlying flavors inherent to the beverage become unmasked and the beverage is perceived to taste more flavorful and smoother. In the case of tannic red wines, the perception is that of fruitier and softer. In the case of coffee or tea, the perception is one of enhanced flavor, increased richness, decreased bitterness and decreased astringency. As per the wine experiments, this effect has been observed in a blind tasting fashion by the inventors and others. Repeatedly, most tasters prefer the sample treated with the magnetic pourer. As per the wine experiments, this effect requires the strong magnetic field and immediate exposure to oxygen. Without oxygen, the softening effect upon the beverage is diminished.

EXAMPLE 1

With regard to red wine and some oak matured white wines, the magnetic wine pourer consistently renders wine in the glass fruitier, softer, and less astringent. This has been found consistently for a variety of red wines, most of recent vintages, and have includes wines from: California, Bordeaux, Rhone Valley, Piedmont, Tuscany, Spain, Washington State, Chile, Argentina, South Africa, and Australia. Varieties tested include: cabernet sauvignon, cabernet, franc, merlot, syrah, grenache, Rhone blends, Bordeaux blends, pinot noir, zinfandel, sangiovese, barbera, nebbiolo, tempranillo, and malbec.

As expected for any taste preference, individuals vary with regard to their preferences. Some consistently prefer the magnetized wine, others consistently prefer non-magnetized wine, while a third group tended to prefer a blend of the two. Most preferred the magnetized wine for some examples, and non-magnetized wines for other samples poured. A generalization that can be made from the tasting experiments was that wines that were overly astringent to begin with, either from harsh tannins, excessive extraction of tannins, or being opened without sufficient bottle age, benefited the most from being poured through the magnetic pourer.

Besides making red wines taste fruitier and softer, the magnetic pourer also made some red wines taste less vegetal, less herbaceous. A characteristic of less than ripe cabernet sauvignon (also cabernet franc, merlot, malbec, and syrah) is that of vegetal, herbaceous characteristics, including bell pepper, green peppercorns, quince, weediness. Winemakers go to great efforts in vineyard site selection, vineyard work, and winemaking techniques (such as micro-oxidation) to decrease these characters. The magnetic wine pourer had a dramatic impact upon such wines, markedly decreasing the vegetal/herbaceous/weedy character of the wine, and thus significantly improving the taste profile. This was particularly true of Chilean wines and mass-produced red wines from California and France.

Proposed mechanisms, which include the polymerization and structural changes of tannins and anthocyanins in the wine, which can lead to decreased astringency and softer, fruitier wines have been discussed in the cited patents.

EXAMPLE 2

Oxygen, via the process of decanting, or during oxidation production racking or micro-oxidation, greatly encourages softening of wines via such chemical changes involving tannins. As such, it is theorized that oxygen was playing a role with regard to device in accordance with the present invention. An experiment was conducted whereby wine was poured, with the magnetic pourer in place, in an oxygen-free environment. The same wine was poured in the presence of oxygen both with and without the magnetic pourer. A recent vintage Chilean cabernet sauvignon was the wine poured. The non-magnetized wine was harshly astringent from hard tannins. The magnetic poured, in the absence of oxygen, did soften the wine slightly. There was a marked difference when the wine was poured through the magnetic pourer in the presence of oxygen. The wine was then made much less herbaceous, and much less astringent while having markedly improved fruit profile. This demonstrates that the combination of oxygen and the magnetic field work in concert to alter the chemistry of the wine to allow for a rapid softening and improvement of the fruit profile.

The pourer 10 is also effects on white wines. The magnetic pourer reproducibly makes over-oaked wines, such as oaky chardonnay, far more approachable, less tannic, and fruiter. The same effect would be expected on other, heavily oaked white wines.

Although there has been hereinabove described a specific beverage pourer with magnetic enhancement in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A pourer for improving organoleptic properties of various beverages, the pourer comprising:
   a base;
   a tubular member extending longitudinally through said base;
   a spout extending outwardly from said tubular member; and
   at least two magnets disposed longitudinally along said tubular member for exposing beverage to a magnetic field as the beverage passes through said tubular member and spout and an air intake opening extending transversely to said tubular member for enabling air to be drawn into the beverage as it is decanted through said tubular member.

2. The pourer according to claim 1 further comprises a stopper extending from said base for insertion into a bottle mouth.

3. The pourer according to claim 2 further comprising a skirt extending from said base for surrounding said stopper and said bottle mouth.

4. The pourer according to claim 3 wherein the magnets abut a top portion of said skirt.

5. The pourer according to claim 4 wherein the magnets are disposed in a spaced apart relationship with an end of said spout.

6. The pourer according to claim 5 further comprising magnet supports integrally molded with said base, stopper, tubular member, and spout.

7. The pourer according to claim 2 wherein the two magnets are disposed 180° degrees from one another around the tubular member.

* * * * *